Sept. 12, 1967  L. G. HORWITT ETAL  3,341,687
ELECTRIC CIGAR LIGHTER
Filed Oct. 23, 1964  2 Sheets-Sheet 2
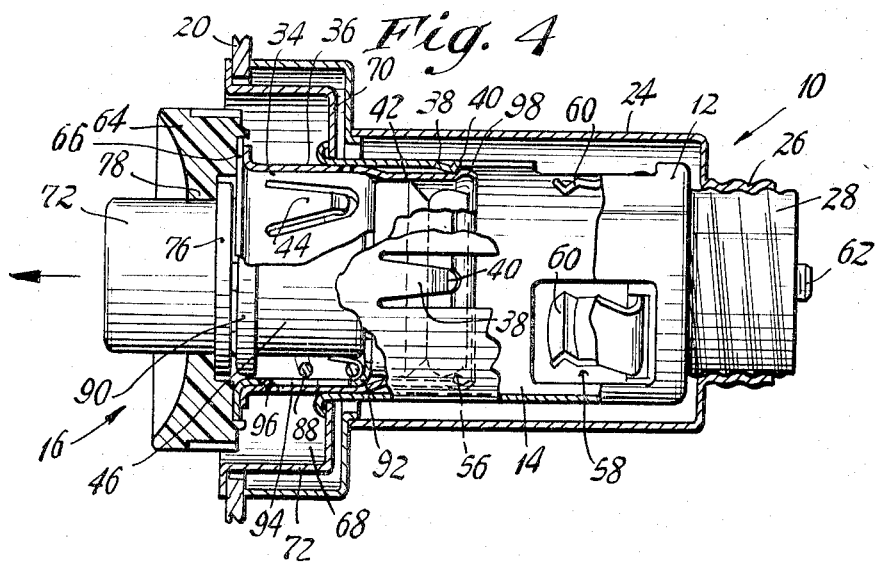
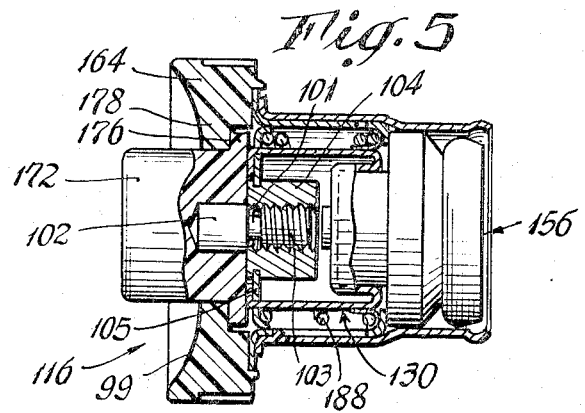
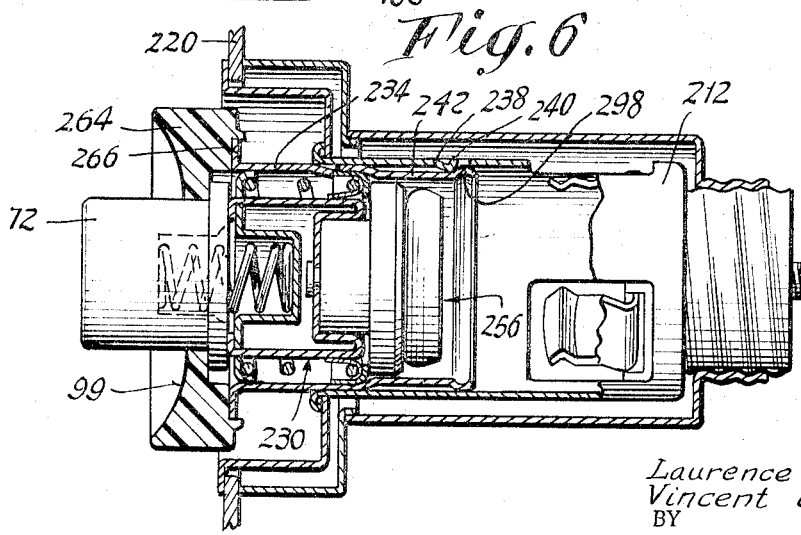
INVENTORS
Laurence G. Horwitt
Vincent G. Krenke
BY
Johnson and Kline
ATTORNEY

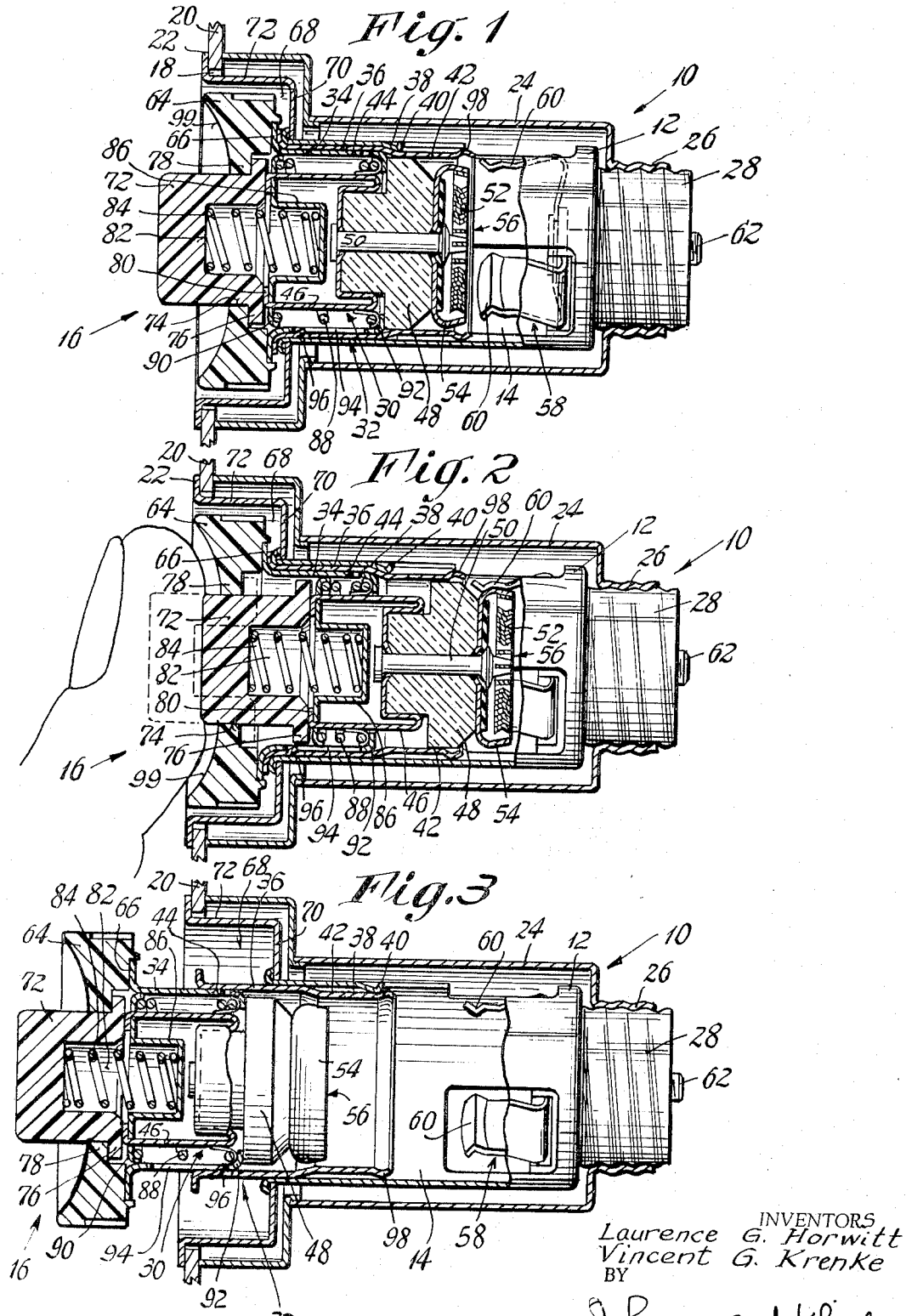

3,341,687
ELECTRIC CIGAR LIGHTER
Laurence G. Horwitt, New Haven, and Vincent G. Krenke, Fairfield, Conn., assignors to Casco Products Corporation, a corporation of Connecticut
Filed Oct. 23, 1964, Ser. No. 406,065
10 Claims. (Cl. 219—267)

ABSTRACT OF THE DISCLOSURE

An electric cigar lighter having a receptacle and an igniting unit removable therefrom. The igniting unit has a handling knob recessed into the receptacle so as to be flush witth the open end of the receptacle when a heating element is in a normal storage position, the handling knob being held stationary when the heating element is moved to an energizing position but being propelled out of the receptacle when the heating element is released by energizing fingers in the receptacle and moves to and beyond the storage position.

---

This invention relates to electrically energized cigar lighters such as those conventionally found in automobiles. More particularly it relates to an improved cigar lighter which is manually moved in a holding receptacle from a storage position to an energizing position and which when sufficiently heated for use is automatically restored to storage position for removal and use.

In such cigar lighters the handling knob in the storage position of the lighter was heretofore arranged to project beyond the plane of the panel on which it is mounted and was liable to be accidentally struck by the head of a person riding in the automobile should the latter be stopped suddenly.

An object of this invention is to provide for avoiding the hazardous projection of the handling knob of a cigar lighter of the type described when the igniting unit is in normal storage position in the receptacle.

This is accomplished, according to the present invention, by arresting the knob when it is returned to storage position in the receptacle in a position in which it does not protrude substantially beyond the plane of the instrument panel while the heating element is in nonenergizing position, and providing for relative movement between the handling knob and the heating element carrier so that the latter may move to closed circuit position from storage position independently of the knob, and be retained in such position to be brought to incandescence, and further providing means which will cause the knob to be moved to finger accessible position beyond the plane of the instrument panel when the heating element is released and ready for use.

The relatively movement between the knob and the heating element carrier to move the latter to energizing position is preferably accomplished, according to the present invention, by manual engagement with a push button extending through the knob to accessible position.

Another object is to make the igniting unit more convenient to handle.

For this purpose a cigar lighter of the present invention is provided with a knob which is substantially enlarged to be conveniently grasped and handled, and the receptacle is provided with a recess in which the knob may enter when the igniting unit is in storage position. This enlarged opening or recess in the receptacle is preferably substantially larger diaametrically than the body of the igniting unit and the portion of the receptacle which receives it so as to serve as a guide entrance when the igniting unit is being returned to the receptacle after use. This feature of the invention is particularly advantageous since it avoids the fumbling that is sometimes required to return an igniting unit to a receptacle when the entering portion of the igniting unit is substantially the same diametrically as the entrance opening of the receptacle.

In one embodiment of the present invention, the foregoing novel features are incorporated in a cigar lighter which has a sliding ash guard and retains the advantages obtained therefrom.

Other features and advantages will hereinafter appear.

In the accompanying drawings:

FIGURE 1 is an elevation in section of one embodiment of the invention illustrating the parts in their normal storage position.

FIG. 2 is a view similar to FIG. 1 illustrating the parts when the heating element carrier has been depressed so that the heating element is in closed circuit position.

FIG. 3 is a view similar to FIG. 1 illustrating the parts in the position they assume when the handling knob of the heating element carrier has been ejected to an accessible position for grasping.

FIG. 4 is a view similar to FIG. 1 illustrating the parts at an intermediate position during the ejecting movement.

FIG. 5 is an elevation partly in section of a modified form of heating element carrier.

FIG. 6 is a view similar to FIG. 3 illustrating another modified form of heating element carrier.

Referring now to the drawings and more particularly to FIG. 1 the cigar lighter of this invention comprises a holding receptacle 10 which includes a generally tubular elongate shell 12 defining a well 14 into which an igniting unit 16 is received and normally stored. The shell 12 extends through an opening 18 provided in a mounting panel 20 (such as the instrument panel of an automobile) and has a front flange 22 which is adapted to be placed against the outer surface of the panel 20. The receptacle 10 is retained in place in the panel 20 by being placed against the latter by a clamping sleeve 24 surrounding the shell 12 and threadedly engaged therewith by a threaded neck 26 engaged with a collar 28 provided on the back end of the shell 12.

The igniting unit 16 as shown comprises a heating element carrier 30 which is axially slidably received within a sleeve means 32 which, as shown in FIGS. 1, 2, 3 and 4 comprises an inner collar or sleeve 34 and an outer sleeve 36 which is axially slidably mounted on the inner sleeve 34. The outer sleeve 36 is snugly received within the shell 12 and there are yieldable friction means cooperable between the shell 12 and the outer sleeve 36 for releasably retaining the outer sleeve 36 in a plurality of positions relative to the shell 12. This means may take the form of a plurality of lanced spring fingers 38 provided on the shell 12 which have inturned projections 40 on the ends thereof which engage a depressed surface portion 42 of the outer sleeve 36 and yieldably resist movement of the sleeve relative to the shell. As shown, the inner sleeve 34 is provided with a plurality of lanced spring fingers 44 which engage the inner surface of the outer sleeve 36 and yieldably resist relative movement between the two sleeves. Thus, the inner sleeve 34 is yieldingly retained in any of a plurality of positions relative to the outer sleeve 36, and the latter is yieldingly retained in any of the plurality of positions relative to the shell 12 of the holding receptacle 10.

The heating element carrier 30 of the igniting unit 16 comprises a tubular elongate member 46 received within the inner sleeve 34, and a ceramic spacer 48 attached to the inner wall of the elongate member 46 by the head of a post 50 which passes through a bore in the ceramic spacer 48. The post 50 is connected to one end of a heating coil 52, the latter being surrounded by a coil cup 54 which is also attached to the ceramic spacer 48 by the post 50.

The coil 52 and the coil cup 54 together constitute a heating element 56 which is adapted to be engaged and releasably held by a holding means 58 disposed in the bottom of the well 14 and which also causes the heating element 56 to be energized for use when the heating element carrier 30 is moved from a normal storage position shown in FIG. 1 axially inwardly to an energizing position shown in FIG. 2 as more fully explained hereinbelow.

The holding means 58 comprises a plurality of bimetallic spring fingers 60 which are mounted in the bottom end of the shell 12 and are electrically connected to the automobile electric supply by means of the stud 62 projecting from the back end of the shell 12. The fingers 60 engage and hold the coil cup 54 and make electrical contact therewith for energizing the coil 52 of the heating element 56. The fingers 60 are thermally responsive and bend outwardly to release the coil cup 54 when the heating coil 52 reaches a predetermined temperature.

Heretofore the heating element carrier in the type of lighter hereinabove described, also was provided with a handling knob so as to be manually moved with the heating element carrier to and from energizing and storage positions in which latter position the knob protruded from the receptacle for finger engagement for the removal and handling of the igniting unit.

As stated above an object of this invention is to provide means whereby in the storage position the handling knob does not substantially protrude beyond the plane of the instrument panel and preferably is substantially flush with the latter.

In accordance with the novel concepts of one form of the invention, this object is achieved by providing a handling knob 64 which, as shown, is received within the shell 12 in such manner as to be enclosed thereby and yet not protrude substantially beyond the mounting panel 20 when the element carrier 30 is in either its normal storage position shown in FIG. 1 or its energizing position shown in FIG. 2. The handling knob 64 is connected to the heating element carrier 30 by being fixedly attached to the outer flanged end 66 of the inner sleeve 34.

In the illustrated embodiment, the shell 12 is provided with an enlarged opening or recess 68 adjacent its outer end which is defined by a radial wall 70 and an axial extension 72 terminating at the mounting panel 20 in the outturned flange 22. The handling knob 64 has a diametrical dimension whereby it is received within the recess 68 but cannot pass into the inner portion of the shell 12 beyond the radial wall 70. Therefore the radial wall 70 acts as a stop means to arrest further inward movement of the handling knob 64 when the igniting unit is being returned to the storage receptacle after use, and also limits the inward movement of the handling knob to a position whereby the heating element 56 cannot be inadvertently moved into engagement with the holding means 58 and energized thereby.

The recess 68 serves as a guide entrance when the igniting unit is being returned to the receptacle after use to substantially eliminate the fumbling that is frequently encountered in returning prior art igniting units to their receptacles. In order to move the heating element carrier 30 from the storage position of FIG. 1 to the energizing position of FIG. 2 without movement of the handling knob 64, the handling knob 64 is attached to the heating element carrier 30 in a manner providing for relative movement between the handling knob and the heating element carrier, and manually operable actuating means are provided on the outer end of the heating element carrier which are carried by the handling knob but is axially movable relative thereto.

As pointed out above, the handling knob 64 is fixedly attached to the outer flanged end 66 of the inner sleeve 34, the latter axially slidably receiving the heating element carrier 30 therewithin. To achieve this movement, the actuating means comprises a manually operable push button 72 which projects through a central aperture 74 formed in the handling knob 64, and is held captive in the handling knob by means of an outturned flange 76 on the button 72 which cooperates with an inturned flange 78 provided on the handling knob. The button flange 76 bears against the outer end 80 of the elongate member 46 and forms the means whereby the heating element may be moved into engagement with the holding fingers 60. The button 72 is further provided with an internal recess 82 which receives the outer end of a coil spring 84, the other end of the coil spring 84 being supported in the bottom of a cup shaped retainer 86 which is secured to the outer end 80 of the elongate member 46. Thus when the button 72 is manually depressed, as illustrated in FIG. 2, the heating element carrier 30 is moved inwardly without movement of the handling knob 64 whereby the heating element 56 is caused to engage the energizing fingers 60. When the finger pressure on the button 72 is released, the spring 82 returns the button to its normal position.

The heating element carrier 30 is further provided with means for propelling the heating element carrier outwardly after it has been retained in the energizing position illustrated in FIG. 2 sufficiently long to bring the heating coil 52 to the required temperature for the release of the coil cup 54 by the energizing fingers 60. This comprises a compressible coil spring 88 which is interposed between the outturned flanged end 90 of the retainer 86 and the inturned flanged end and the inner flanged end 92 of the inner sleeve 34. It will be apparent that as the heating element carrier 30 is moved inwardly of the shell 12 by manual depression of the actuating button 72, the spring 88 is compressed between the flange 90 of the retainer 86 and the flange 92 of the inner sleeve 30 which, it will be recalled, cannot move inwardly because of its attachment to the handling knob 64. The spring 88 when compressed stores sufficient energy so that, upon release of the heating element 56, the heating element carrier 30 is rapidly returned toward its normal storage position and strikes the flange 76 of the button 72 with sufficient impact to move the handling knob 64 and the inner sleeve 34 attached thereto outwardly of the shell 12 to the position shown in FIG. 3.

The inner sleeve 34 is provided with a plurality of slots 94 which cooperate with a corresponding plurality of lugs 96 formed in the outer sleeve 46 to limit the amount of relative movement therebetween. The spring 88 stores sufficient energy so that when the inner sleeve 34 has moved to a position on the bottom of the slot 94 and contacts the lug 96, the heating element carrier continues to move outwardly and carries the outer sleeve 36 therewith. This movement continues until a stop means provided on the outer sleeve which comprises an annular bead or projection 98, is engaged by the inturned projections 40 on the lanced spring fingers 38 of the shell 12. In this position of the parts, as seen in FIG. 3, the handling knob 64, is exposed substantially beyond the mounting panel 20 and is accessible for grasping by the user for removal of the lighter.

In this embodiment of the invention, the outer sleeve 36, when extended beyond the heating element 56 in the position illustrated in FIG. 3, constitutes an ash guard which protects the user against inadvertent falling of ignited particles of tobacco. It is, however, readily retractable to facilitate lighting of pipes.

It should be noted that no particular significance is attached to the order of relative movement between the inner and outer sleeves on the one hand and between the outer sleeve and the shell 12 on the other hand. For example, as illustrated in FIG. 4, the relative amount of friction between the fingers 44 of inner sleeve 34 on the outer sleeve, and the fingers 38 of the shell 12 on the outer sleeve, may be such that when the heating element carrier strikes the actuating button 72 the outer sleeve 36 moves first to the position illustrated in FIG. 4 until further movement of the outer sleeve is prevented by engagement of the projection 40 of the shell fingers 38 with the stop bead 98 on the outer sleeve 30, and thereafter, the inner sleeve 34 continues to move inwardly under the influence of the spring 88 until the bottom of the slot 94 provided in the inner sleeve engages the lug 96 found on the outer sleeve 36.

In operation of the cigar lighter of this invention, manual depression of the actuating button 72 as illustrated, in FIG. 2, moves the heating element carrier 30 with the heating element 56 attached thereto inwardly toward the bottom of the shell 12 through the inner action of the actuating button flange 76, the elongate member 42 and the ceramic spacer 48. This movement continues until the heating element cup 54 is engaged by the spring finger 60 and securely held thereby, whereupon release of the actuating button 72 permits it to return to the position illustrated in FIG. 1 by the action of the coil spring 84. The heating coil 52 is energized by the automobile electric supply through the connecting stud 62 and the holding finger 60, the heating element 52 being grounded through the post 50, the elongate member 46 and the other contacting metallic parts of the igniting unit and the receptacle 10.

When the heating element 52 reaches a predetermined temperature the finger 60 being bimetal, moves inwardly and gradually releases the holding force on the coil cup 54 until the force of the coil spring 88 begins to move the heating element carrier 30 outwardly of the shell 12. During this movement, the outer flange end 80 of the elongate member 46 strikes the actuating button with sufficient impact to move it and the handling knob 64 and the inner sleeve 34 attached thereto outwardly until the handling knob 64 reaches the accessible grasping position illustrated in FIG. 3.

The lighter is removed from the holding receptacle 10 by grasping the handling knob 64 and pulling outwardly of the receptacle with sufficient force to overcome the retention of the projections 40 against the stop bead 98 of the outer sleeve 96.

After the lighter has been used it is returned to the receptacle and the handling knob 64 is pushed inwardly until it is received within the enlarged recess 68 of the shell 12 whereupon the parts reassume the positions illustrated in FIG. 1. As indicated above the recess greatly facilitates the insertion of the igniting unit within the receptacle by acting as a guide for the igniting unit which substantially reduces the visual observation that is otherwise required and/or the fumbling that will otherwise result.

FIG. 5 illustrates a modified form of the invention in which the holding receptacle is identical to that shown in FIGS. 1 through 4 and therefore is not shown in FIG. 5, and the igniting unit 116 is substantially the same as that shown in the previous figures with the exception of the means for connecting the actuating button 172 to the heating element carrier 130. In this form of the invention, the actuating button 172 is rigidly attached to the heating element carrier 130 by means of a threaded stud 101 which has a head portion 102 embedded in the actuating button 172, and has a threaded portion 103 threadedly engaged with a nut 104 which is firmly attached to the inner surface of an annulus 105. The annulus 105 is formed similarly to the top flange portion 80 of the cup shaped retainer 46 of the previous embodiment with the cup portion of the member removed. All other components of this modified igniting unit are identical with corresponding components of the igniting unit of the embodiment shown in FIG. 1.

The operation of this form of igniting unit is substantially the same as that of the previous embodiment described above with the exception that the actuating button 172 remains in a rearward or depressed position relative to the handling knob, 164 while the igniting unit as a whole is in the energized or the closed circuit position illustrated in FIG. 2. When the holding fingers release the heating element 156, the igniting unit ejects under the influence of the spring 188, and the flange 176 of the actuating button 172 strikes the flange 178 surrounding the central aperture of the knob 164 with sufficient impact to propel the igniting unit to the position illustrated in FIG. 3 by the same procedure as that described above regarding the embodiment shown in FIG. 1. Thus, most of the advantageous features of the previous embodiment of the invention are retained in a structure which is simpler in nature and easier to assemble.

FIG. 6 illustrates still another embodiment of the invention in which the outer sleeve which constitutes the sliding ash guard of the embodiment illustrated in FIGS. 1 through 4 is eliminated and is replaced by a fixed ash guard formed as an extension of the inner sleeve, thereby again achieving a slightly more simplified structure without loss of the major features of the invention. Thus, the sleeve or collar 234, which axially slidably receives the heating element carrier 230 in a manner above described, is provided with a cylindrical extension 242 which, in both the storage and operating positions of the parts, extends somewhat beyond the end of the heating element 256 to form a modified ash guard. The back end of the sleeve 234 is provided with an annular projection 298 which is engaged by the projection 240, formed on the back end of the lanced fingers 238 to prevent the igniting unit from ejecting completely out of the shell 212, substantially as described above. The handling knob 264 is fixedly attached to the outer flanged end 266 of the sleeve 234. The remaining components of this embodiment of the invention are identical with those illustrated and described above in regard to the embodiment of FIGS. 1 through 4, and further description of this embodiment is not believed necessary.

The operation of this embodiment of the invention is similar to that described above in connection with the embodiment illustrated in FIGS. 1 through 4 with the exception that as the heating element carrier 230 moves outwardly beyond the storage position, there is relative movement only between the sleeve 234 and the shell 212. The heating element carrier 230 moves outwardly by the amount permitted by the recessed portion 242 of the sleeve 234 until the stop bead 298 engages the projections 240 on the spring fingers 238. Although this distance is less than the extent of movement achieved in the embodiment illustrated in FIGS. 1 through 4 because of the elimination of the relative movement between the inner and outer sleeves of that embodiment, the handling knob 264 is nevertheless moved outwardly beyond the mounting panel 220 sufficiently to be grasped by the user for removal of the igniting unit from the storage receptacle.

It should be noted that the handling knob in each of the embodiments of the invention is provided with an outwardly facing recess 99 of concave curvature over at least a major portion of the outer surface of the handling knob surrounding the central aperture. The recess 99, as shown in FIG. 2 receives the finger of the user when depressing the actuating button 77 to energize the igniting unit. By recessing the handling knob in this manner, the projection of the button 72 beyond the front face of the mounting panel 20 is held to a minimum, thereby further increasing the safety advantages of this invention.

It will be apparent from the foregoing description and accompanying drawings that there is provided a flush mounted cigar lighter which overcomes the aforementioned disadvantages of prior art lighters and achieves the foregoing objects. It is to be understood that the invention is not limited to the specific embodiments described and shown herein, which are intended to illustrate the best modes presently contemplated for carrying out the principles of the invention and which are suscep-

What we claim and desire to secure by Letters Patent is:

1. A cigar lighter comprising
   (A) a tubular receptacle having an outer open end,
   (B) an igniting unit removably carried in the receptacle in a normal storage position, said igniting unit including a handling knob, a heating element carrier axially movable relative to the receptacle in opposite directions from said normal storage position, manually operable means accessible through the handling knob for moving the heating element carrier from said storage position inwardly to an energizing position, and spring means for moving said heating element carrier outwardly from said energizing position,
   (C) said receptacle including means for substantially enclosing said handling knob therein when the igniting unit is in said normal storage position,
   (D) means engageable between the receptacle and the handling knob for preventing movement of the handling knob inwardly of the receptacle when the heating element carrier is moved by said manually operable means inwardly of the receptacle from said normal storage position, and
   (E) means engageable between said heating element carrier and said handling knob for moving the handling knob outwardly of said receptacle when the heating element carrier is moved by said spring means outwardly from said energizing position whereby the handling knob becomes accessible for removing the igniting unit from the receptacle.

2. A cigar lighter as set forth in claim 1 wherein said manually operable means comprises a central push button having a portion projecting outwardly through an aperture in said handling knob and a rear portion engageable with said heating element carrier.

3. A cigar lighter as set forth in claim 2 wherein said push button is held captive by said handling knob and is biased outwardly of said heating element carrier by a compression spring interposed between said button and said heating element carrier.

4. A cigar lighter as set forth in claim 2 wherein said button is fixedly attached to said heating element carrier.

5. A cigar lighter as set forth in claim 1 wherein the igniting unit includes a tubular body portion having means fixedly mounting said handling knob on the outer end thereof, said heating element carrier being slidably mounted in said tubular body portion.

6. A cigar lighter as set forth in claim 5 wherein said means for preventing inward movement of the handling knob comprises means on the tubular body portion engageable with the receptacle for preventing inward movement of the tubular body portion from said normal storage position when said heating element carrier is moved inwardly therefrom by said manually operable means.

7. A cigar lighter as set forth in claim 1 wherein said means for moving the handling knob outwardly of said receptacle comprises abutment means cooperable between the heating element carrier and the handling knob and engageable in said normal storage position of the heating element carrier such that when the heating element carrier is moved outwardly of the receptacle by said spring means with sufficient force, the impact of the abutment means propels the handling knob outwardly of the outer open end of the receptacle, said spring means being effective to maintain said abutting engagement between the handling knob and the heating element carrier after the heating element carrier and the handling knob have moved outwardly of the receptacle from said normal storage position.

8. In a cigar lighter of the type having
   (A) a tubular receptacle having an outer open end,
   (B) an igniting unit removably carried in the receptacle in a normal storage position, said igniting unit including
      (1) a handling knob,
      (2) a tubular body portion, and
      (3) a heating element carrier axially movable relative to the body portion between said normal storage position and an energizing position,
   (C) said receptacle including means for substantially enclosing said handling knob therein when the igniting unit is in said normal storage position,
   (D) spring means for moving said heating element carrier outwardly from said energizing position, and
   (E) means engageable between said heating element carrier and said handling knob for moving the latter outwardly of the receptacle to an accessible position when the heating element carrier is moved by said spring means outwardly from said energizing position,
the improvement comprising:
   (F) manually operable means carried by the handling knob for movement relative thereto and operatively engaged with said heating element carrier for moving the latter from said storage positon inwardly to said energizing position, and
   (G) means engageable between the receptacle and the handling knob for preventing movement of the handling knob inwardly of the receptacle when the heating element carrier is moved inwardly relative to said body portion by said manually operable means whereby said handling knob remains stationary when the heating element carrier is moved from the normal storage position to the energizing position by said manually operable means but is propelled outwardly to the accessible position when the heating element carrier is moved from the energizing positon toward and beyond the normal storage position by said spring means.

9. A cigar lighter according to claim 1 wherein said tubular body portion of the igniting unit has an outer flanged end which arrests inward movement of the body portion at the normal storage position, and is retained in the receptacle by yieldable resilient means, said handling knob being fiexedly mounted on the outer flanged end of the body portion whereby the handling knob is not subject to the force of stored energy when in the normal storage position.

10. A cigar lighter according to claim 9 wherein said manually operable means comprises a button projecting axially through a central aperture in said handling knob for engagement by the finger of a user, said button having means capturing the buttons between the handling knob and the heating element carrier whereby said button is effective to transmit an inpact force from the heating element carrier to the handling knob, when the former is moved by said spring means, so as to propel the handling knob to said accessible position.

References Cited

UNITED STATES PATENTS

| 1,756,013 | 4/1930 | Jackson | 219—266 |
| 1,757,255 | 5/1930 | Mahan | 219—266 |
| 2,224,034 | 12/1940 | Lehmann | 219—265 |
| 2,939,940 | 6/1960 | Dening et al. | 219—264 |

FOREIGN PATENTS 517,220   1/1940   Great Britain.

RICHARD M. WOOD, *Primary Examiner.*

V. Y. MAYEWSKY, *Assistant Examiner.*